(12) United States Patent
Tohda et al.

(10) Patent No.: US 6,702,363 B2
(45) Date of Patent: Mar. 9, 2004

(54) ROOF STORAGE STRUCTURE FOR VEHICLES

(75) Inventors: Isao Tohda, Hiroshima (JP); Haruo Ohe, Hiroshima (JP); Kouji Iwasaka, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 10/368,454

(22) Filed: Feb. 20, 2003

(65) Prior Publication Data
US 2003/0160475 A1 Aug. 28, 2003

(30) Foreign Application Priority Data
Feb. 25, 2002 (JP) ........................... 2002-047911

(51) Int. Cl.$^7$ .................................. B60J 7/00
(52) U.S. Cl. ............... 296/124; 296/108; 296/107.17; 296/65.09
(58) Field of Search ............... 296/124, 107.08, 296/108, 107.17, 37.16, 65.01, 65.09, 107.01, 65.16

(56) References Cited

U.S. PATENT DOCUMENTS

| | | | | |
|---|---|---|---|---|
| 4,736,985 A | * | 4/1988 | Fourrey et al. | 296/69 |
| 4,758,038 A | * | 7/1988 | Okada | 296/26.06 |
| 4,776,630 A | * | 10/1988 | Fukutomi et al. | 296/107.17 |
| 4,796,943 A | | 1/1989 | Fukutomi et al. | |
| 4,854,634 A | * | 8/1989 | Shiraishi et al. | 296/108 |
| 5,429,409 A | | 7/1995 | Corder et al. | |
| 5,584,522 A | * | 12/1996 | Kerner et al. | 296/108 |
| 5,647,630 A | * | 7/1997 | Jambor et al. | 296/108 |
| 5,658,039 A | * | 8/1997 | Bennett | 296/180.5 |
| 5,967,591 A | * | 10/1999 | Muehlhausen | 296/107.16 |
| 6,062,625 A | * | 5/2000 | Elelnrieder et al. | 296/108 |
| 6,217,096 B1 | * | 4/2001 | Koiwa et al. | 296/65.09 |
| 6,322,130 B1 | * | 11/2001 | Wanden et al. | 296/107.01 |
| 6,481,772 B1 | * | 11/2002 | Tenn | 296/26.11 |
| 6,598,926 B1 | * | 7/2003 | Price et al. | 296/65.09 |
| 2002/0135200 A1 | * | 9/2002 | De Gaillard | 296/107.01 |
| 2003/0047961 A1 | * | 3/2003 | Nania | 296/107.08 |
| 2003/0080580 A1 | * | 5/2003 | Obendiek | 296/107.17 |

FOREIGN PATENT DOCUMENTS

| | | | |
|---|---|---|---|
| DE | 4431573 A1 | * | 3/1995 |
| DE | 44 38191 | * | 7/1995 |
| DE | 195 14 785 | * | 9/1995 |
| DE | 44 38 190 C | | 11/1995 |
| DE | 44 38 190 | * | 11/1995 |
| DE | 298 17 132 | * | 3/2000 |
| DE | 101 04 523 | * | 10/2002 |
| EP | 0 779 172 | * | 6/1997 |
| EP | 0 860 311 | * | 8/1998 |
| FR | 2 351 819 A | | 12/1977 |
| JP | 62 120219 | * | 6/1987 |
| JP | 62 120221 | * | 6/1987 |
| JP | 7-25245 | | 1/1995 |
| JP | 8 58387 | * | 3/1996 |
| JP | 8-85344 | | 4/1996 |

OTHER PUBLICATIONS

European Search Report Dated May 7, 2003.

* cited by examiner

*Primary Examiner*—Kiran Patel
(74) *Attorney, Agent, or Firm*—Nixon Peabody LLP; Donald R. Studebaker

(57) ABSTRACT

A vehicle with a folding hard roof is provided with a rear passenger space between front and rear seats that is suitably expanded by turning a rear seatback forward down and then moving the rear seatback backward so as to receive the folding hard roof retracted therein.

11 Claims, 12 Drawing Sheets

ROOF STORAGE STRUCTURE FOR VEHICLES

BACKGROUND OF THE INVENTION

1. Field of the Invention

The present invention relates to a roof storage structure for vehicles having a folding hard roof.

2. Description of Related Art

There have been known convertible vehicles with a folding roof that are converted to open vehicles when the folding roof is retracted. One of such the vehicles is disclosed in, for example, U.S. Pat. No. 5,429,409, entitled "Convertible Top," issued to George A. Corder et al., Jul. 4, 1995. This vehicle is equipped with a folding roof comprising three parts, namely a front roof part made of a substantially rigid panel, an intermediate roof part made of a flexible sheet and a rear roof part made of a substantially rigid panel such as a rear windshield glass. Another one of such the vehicles is disclosed in, for example, U.S. Pat. No. 5,584, 522, entitled "Stowage-Space Arrangement for Vehicles with a Folding Roof," issued to Wolfgang Kernre et al., Dec. 17, 1996. This convertible vehicle is equipped with a retractable roof comprising two parts, namely a forward roof part and a rearward roof part, both made of a rigid panel, that are connected to each other by a hinge.

These vehicles with a folding roof are changeable between a closed state where a passenger compartment is closed up by the folding roof and an open state where the folding roof is retracted and opens the passenger compartment.

The vehicle that is disclosed in U.S. Pat. No. 5,429,409 is converted to a sporty two-seater roadster by folding and retracting the flexible intermediate roof part and the rigid rear roof part in a space above rear seats left unfolded and closing a rear passenger space behind the front seats by the rigid front roof panel. Because of a flexible sheet employed for the intermediate roof part, the roof can be folded compactly, so that it is realized to design a vehicle body with a comparatively small roof storage space and/or to design seat arrangement that is easy to avoid mechanical interference of the roof with, for example, a seat back of a rear seat In the course of folding and retracting the roof into the roof storage space.

However, in the case where a vehicle is equipped with a folding hard roof such as disclosed in U.S. Pat. No. 5,584, 522, the circumstances begin to present an entirely different picture from the folding roof including a flexible sheet. Specifically, in order to be stored in a confined space, the folding hard roof is in want of artful contrivance regarding avoidance of mechanical interference with structural parts of the vehicle body such as a rear seat and retracted posture of the folding hard roof. For example, in order to provide a roof storage space for the folding hard roof, the seat cushion with the seatback superposed thereon is raised up against the seatback of the front seat.

In either roof storage configuration, since the roof storage space is provided by moving the rear seat within a rear passenger space only, it can be hardly said that the roof storage space is sufficiently large to store the folding hard roof particularly in the case where the vehicle body is designed to be compact in a lengthwise direction.

SUMMARY OF THE INVENTION

It is therefore an object of the present invention to provide a roof storage structure suitable for a vehicle with a folding hard roof that is converted to an open vehicle by folding and retracting the folding hard roof into a rear passenger space between front seats and rear seats that is expandable in effect and also suitable for increasing the design freedom of storage of the folding hard roof resulting from the expandable rear passenger space.

It is another object of the present invention to provide roof storage stricture suitable for a vehicle, such as having two front seats and two rear seat subsidiary used, that is equipped with a folding roof retractable into a comparatively small rear passenger space between the front seats and the rear seats.

The foregoing objects of the present invention is accomplished by a roof storage structure for a four-seat vehicle with a folding hard roof retractable into a rear passenger space provided between front seats and rear seats in a passenger compartment. The rear seat is partly movable backward so as to expand the rear passenger space in a lengthwise direction of said passenger compartment from the front to the back suitably for a roof storage space in which the folding hard roof is retracted. The rear seat has a seatback with an upper part movable backward with respect to the remaining part of the seatback.

According to the roof storage structure in which the rear passenger space is expanded in the lengthwise direction by moving partly the rear seat, the design freedom of storage of the folding hard roof in increased. In particular, it is realized to assure both compact body of the vehicle and spacious roof storage space which are somewhat conflicting with each other.

The roof storage structure of the present invention is suitable for vehicles with a folding hard roof that is comparatively long in a lengthwise direction. The vehicle with the roof storage structure of the present invention is convertible between a two-seater open mode, like a two-seater roadstar, in which the folding hard roof opens the passenger compartment and is retracted in the rear passenger space expanded by moving the rear seats at least partly backward and a closed mode, like a two-door coupe, in which the folding hard roof closes the passenger compartment. Further, the vehicle in the closed mode is selectively changed between a utility mode in which the rear seats are moved at least partly backward so as to expand the rear passenger space for roof storage and an ordinary four-seat mode in which passengers can sit on the rear seats. In the utility mode in which the rear passenger compartment is expanded, the vehicle can be loaded with cargos in the rear passenger space, so as to enhance the convenience thereof.

In the case where the folding hard roof which comprises three parts, namely front, middle and real roof parts, mechanically connected with one another is retracted with the middle and rear roof parts superposed on each another below the front roof part situated horizontally in the roof storage space.

In the case where the vehicle has a trunk room separated behind the passenger compartment, the rear seat is at least partly movable backward into the trunk room. When the rear seat is partly moved into the trunk room, there is provided an aperture between the passenger room, in particular the rear passenger space of the passenger room, and the trunk room that is closed and opened by the rear seat. When the rear seat is partly moved, the aperture is opened, so as thereby to provide a trunk-through formation where the passenger compartment opens into the trunk room. The trunk-through formation enables the vehicle 1 to be loaded with even an article that is too long to be stored within the trunk room.

Although the roof storage structure is suitably installed to a two-door four-seat sporty vehicles, it may be otherwise installed to four-door vehicles. In either case, the rear seat is desirably of subsidiary type.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 1:
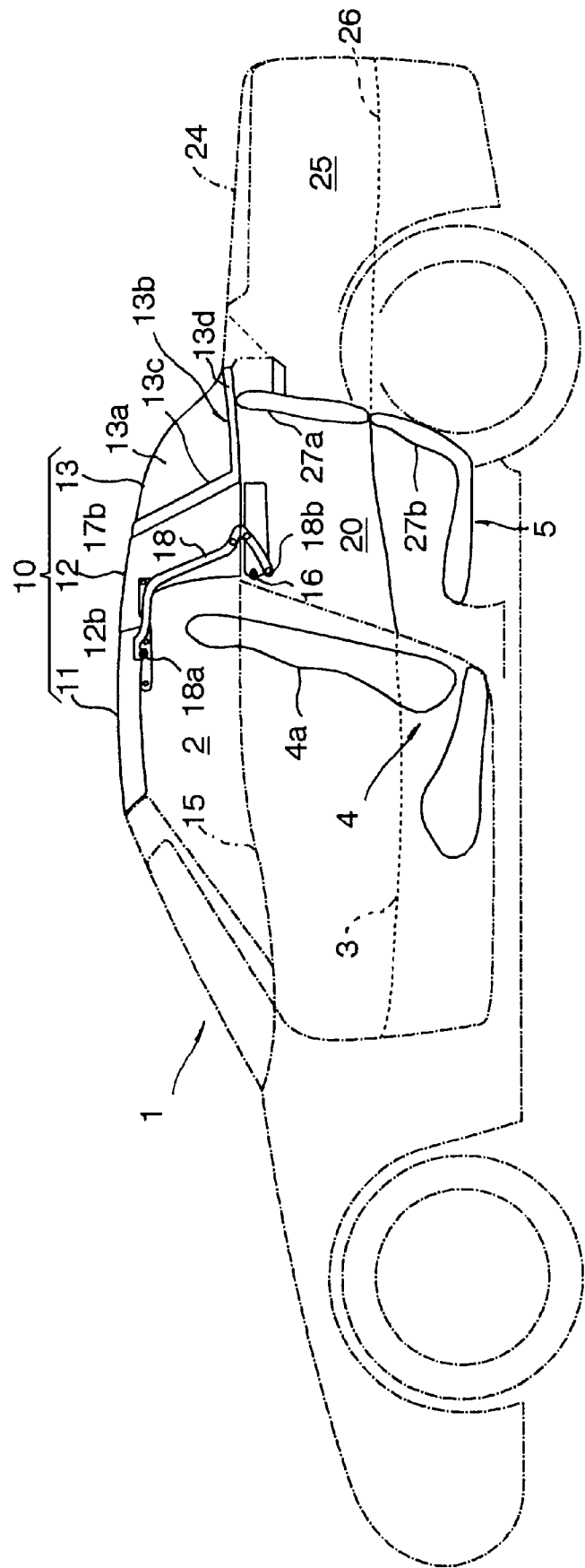
FIG. 1 is a side view of a vehicle with a roof storage structure in accordance with an embodiment of the present invention in which a folding hard roof is in a closed position.

In the following description, the same reference numerals are used to denote elements and/or mechanisms that are the same as or similar in operation and structure throughout the drawings. A folding hard roof is shown as one example of folding roofs that can be retracted in a roof storage structure of the present invention and not confined in roof structure and folding structure to the shown example.

Figure 2:
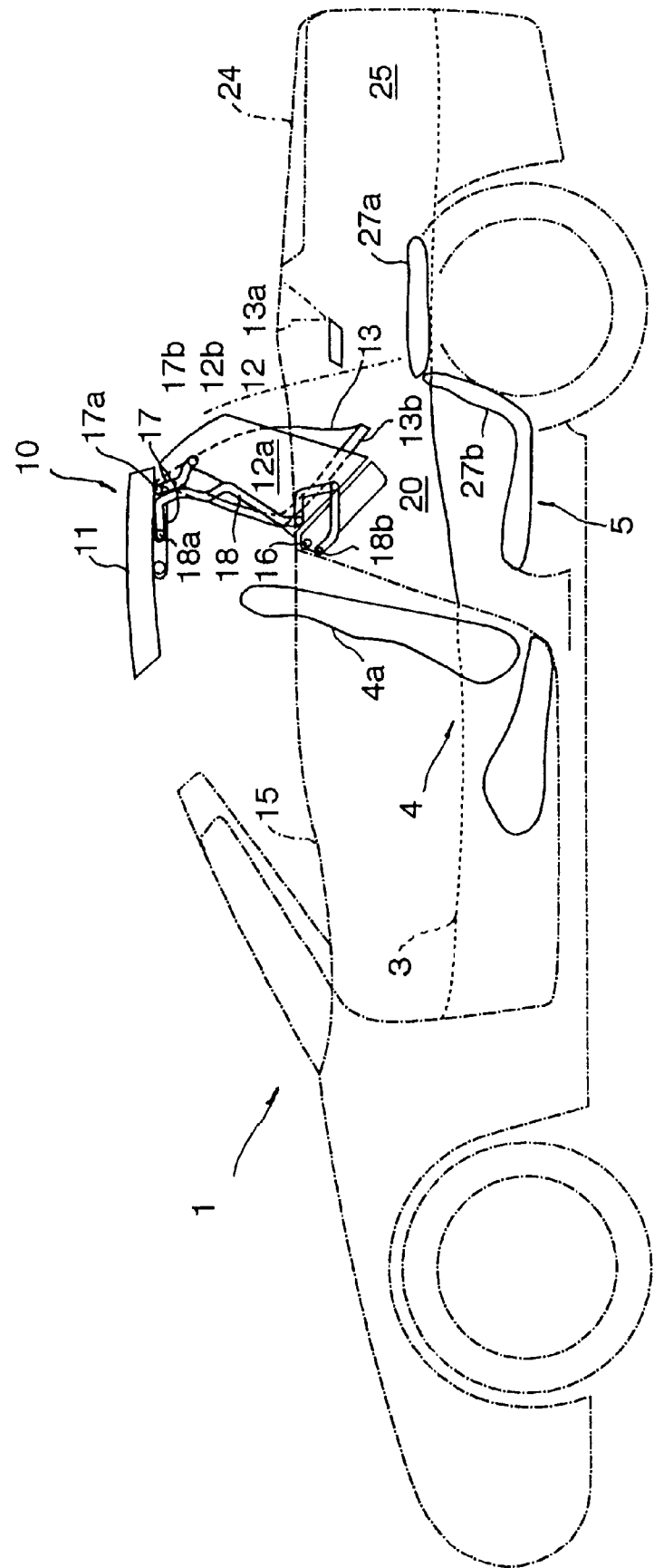
FIG. 2 is a side view of the vehicle in which the folding hard roof is on the way to a roof storage space.
Figure 3:
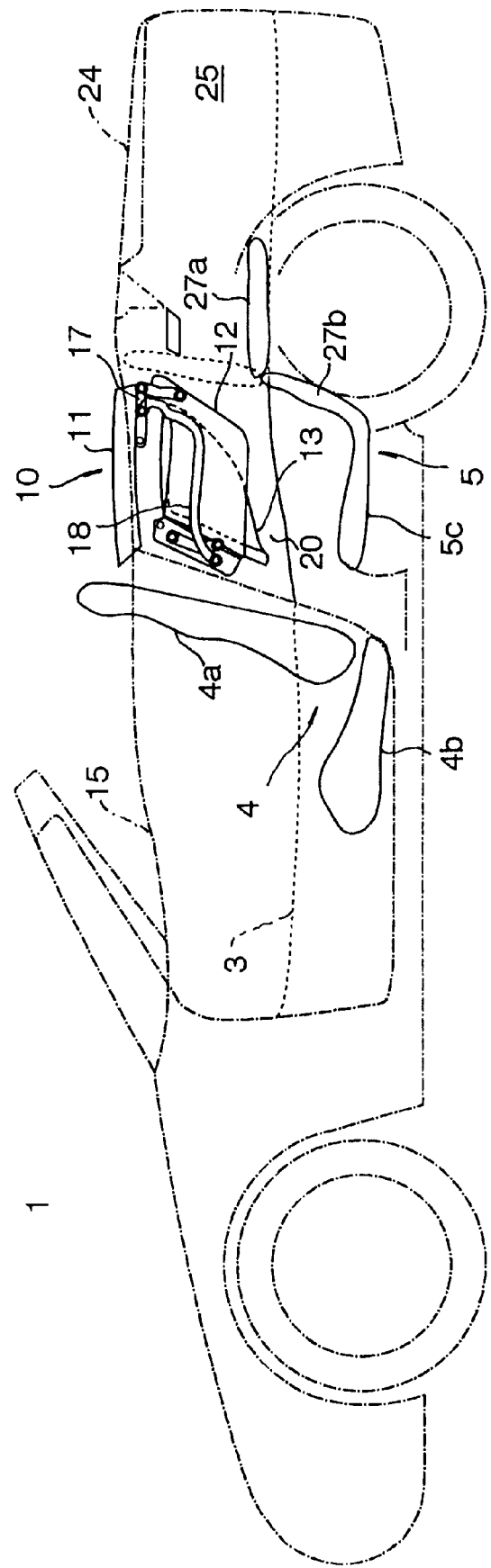
FIG. 3 is a side view of the vehicle in a two-seater open mode in which the folding hard roof is retracted.

Referring to the drawings in detail, and, more particularly, to FIGS. 1 through 3 showing a vehicle 1 with a folding hard roof 10 such as a two-door sports vehicle, the vehicle 1 is equipped with side doors 15 and has a passenger compartment 2 opened and closed by the side doors 15. There are equipped with four seats, namely two front bucket seats 4 and two rear seats 5 such as auxiliary rumble seats simplified in structure, in the passenger compartment 2. The passenger compartment 2 at its floor has a comparatively high floor tunnel 3 formed in the middle of the compartment 2 in a transverse direction of the vehicle 1 and extending in a lengthwise direction of the vehicle 1 from the front to the back. The front seats 4 are disposed on opposite lateral sides of the floor tunnel 3, respectively. Similarly, the rear seats 5 are disposed on opposite lateral sides of the floor tunnel 3, respectively. The rear seat 5 comprises a rear seat cushion 5c and a rear seatback 27. The rear seatback 27 comprises two halves of seatbacks, namely an upper half of seatback (which is hereafter referred to as an upper seatback) 27a extending above the floor tunnel 3 and a lower half of seatback (which is hereafter referred to as a stationary lower seatback) 27b extending below the floor tunnel 3. The seat cushion 5c and the stationary lower seatback 27b are formed as an integral piece. The upper seatback 27a is pivotally mounted to part of the vehicle body so as to turn forward and slide horizontally backward after turning forward as will be described in detail later.

The folding hard roof 10 is divided into three separate roof sections or components namely a front roof component 11, a middle roof component 12 and a rear roof component 13. The front roof component 11 is made of a comparatively light rigid panel, desirably such as for example an aluminum panel, which has a flat square shape so as to cover over a space above heads of passengers sitting on the front seats 5. The middle roof component 12 is made of a comparatively light rigid panel, desirably such as for example an aluminum panel, which has a shape comprising an approximately flat top part 12b and opposite side parts 12a extending between the flat top part 12b and rear side body panels of the vehicle 1 behind the side doors 15, respectively. The rear roof component 13, that is formed by means of a rear window glass 13a fitted in a desirably single piece of window frame 13b having a front frame portion 13c and a hemline frame portion 13d, extends obliquely downward from a rear top edge of the flat top part 12b of the middle roof component 12 and curves convexly rearward between rear edges of the opposite side parts 12a of the middle roof component 12. The front frame portion 13c and a hemline frame portion 13d forms an obtuse angle therebetween.

The folding hard roof 10 thus comprising the three roof components is equipped with a folding structure comprising two folding link mechanisms arranged disposed at opposite sides of the folding hard roof 10, respectively. Specifically, each of the folding link mechanism comprises a pivot shaft 16 that is fixedly attached to the rear side body panel on which the middle roof component 12 at its lower front end is pivotally mounted, a first link 17 that is pivotally mounted on a pivot shaft 17a fixedly attached to a rear end portion of the front roof component 11 at one end thereof and a pivot shaft 17b fixedly attached to a front end portion of the middle roof component 12 at another end thereof so as to interconnect the front roof component 11 and the middle roof component 12, and a multi-joint link 18 that is pivotally mounted on a pivot shaft 18a fixedly attached to the rear end portion of the front roof component 11 and a pivot shaft 17b fixedly attached to a front end portion of the middle roof component 12 so as to interconnect the front roof component 11 and the middle roof component 12. The folding link mechanism further another multi-joint link (not shown) that interconnecting a lower end portion of the rear roof component 13 and a lower end portion of the middle roof component 12.

As shown in FIG. 2, when the middle roof component 12 pivotally turns backward in a clockwise direction about the pivot shaft 16, the folding link mechanism causes the front roof component 11 to shift approximately horizontally backward and simultaneously causes the rear roof component 13 to raise itself upward while shifting forward. As the middle roof component 12 further pivotally turns backward in the clockwise direction about the pivot shaft 16 until it comes down into an almost recumbent position, the rear roof component 13 turns approximately 90° and is finally brought into a position where it places its front frame portion 13c in an approximately horizontal position or places the hemline frame portion 13d in an approximately erect position so as to run fronting backsides of seatbacks 4a of the front seats 4 that inclines backward as shown in FIG. 3.

As apparent from FIG. 3 showing the folding hard roof 10 retracted in a rear space 20 of the passenger compartment 2 between the front and rear seats 4 and 5 that doubles as a roof storage space, when the folding hard roof 10 is retracted into the rear space, i.e. the roof storage space 20, the rear roof component 13 is situated with the hemline frame portion 13d turned approximately 90° into an approximately erect position so as to run fronting backsides of seatbacks 4a of the front seats 4, the middle roof component 12 is turned approximately 90° forward down into a laid position, and the front roof component 11 is situated in a horizontal position above the rear seat 4 so as to cover the middle and rear roof components 12 and 13. Accordingly, the vehicle 1 with the folding hard roof 10 retracted in the roof storage space 20 has an external conformation like a two-seater roadstar as shown in FIG. 3.

The vehicle 1 at its rear end has a trunk room 25 that has a trunk room floor 26 and is covered by a trunk rid 24. The trunk room floor 26 is level with a top surface of the floor tunnel 3 of the floor of the passenger compartment 2 and supports the upper seatback 27a thereon when the upper seatback 27a slides horizontally backward after laying forward down. On the other hand, when the upper seatback 27a lays forward down, there is provided an aperture 36 between the passenger room 2, in particular the rear passenger space 20 of the passenger room 2, and the trunk room 25 so as thereby to provide a trunk-through formation which is referred to a state where the passenger compartment 2 opens into the trunk room 25 as shown in FIG. 4.

Figure 5:
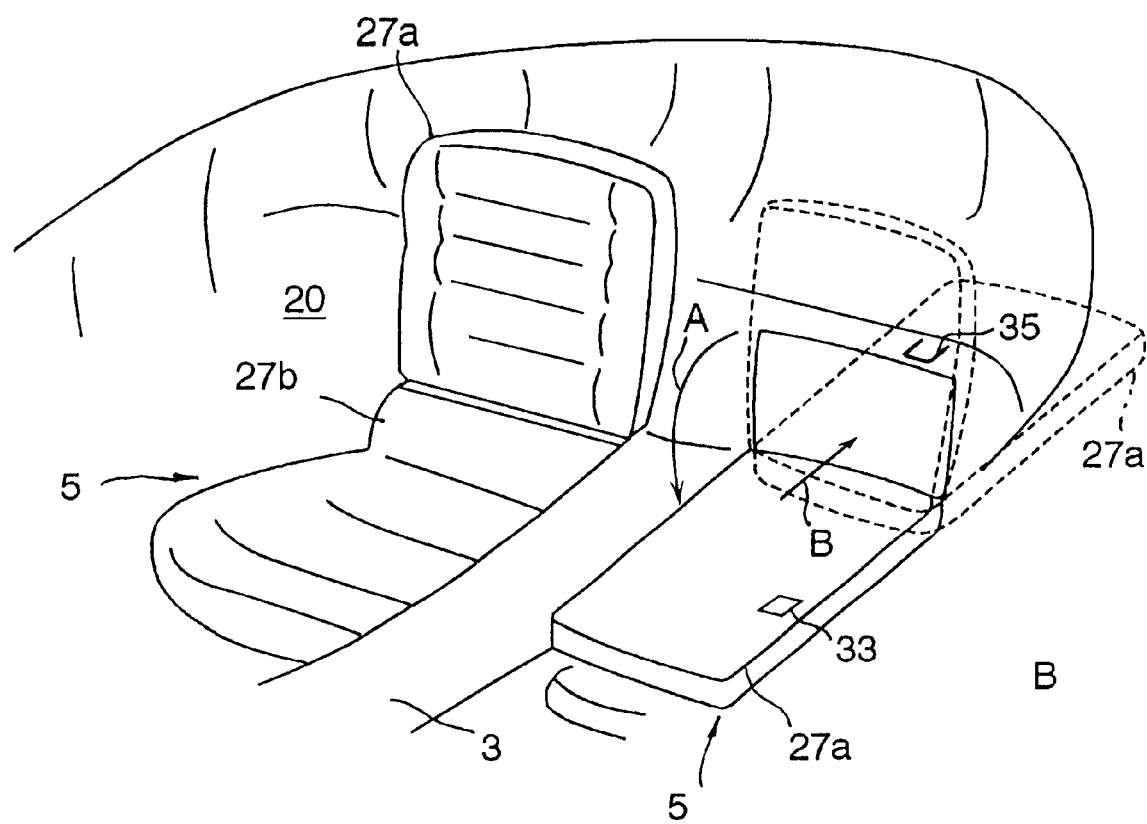
FIG. 5 is a perspective view of a rear seat section of the vehicle in which the upper seatback of the rear seatback of one of two rear seats is laid forward down.
Figure 6:
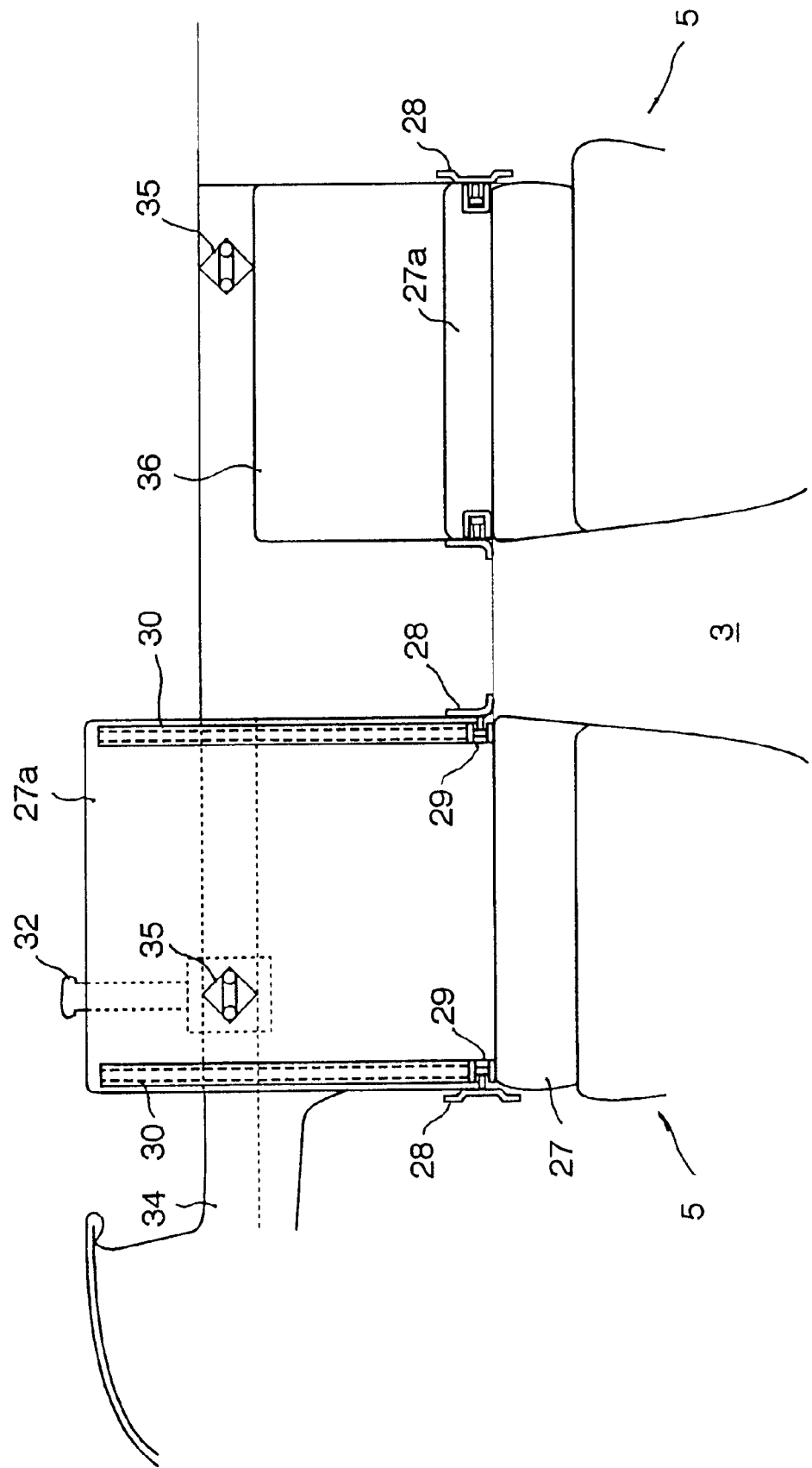
FIG. 6 is a front view of the upper seatback of the rear seatback.
Figure 7:
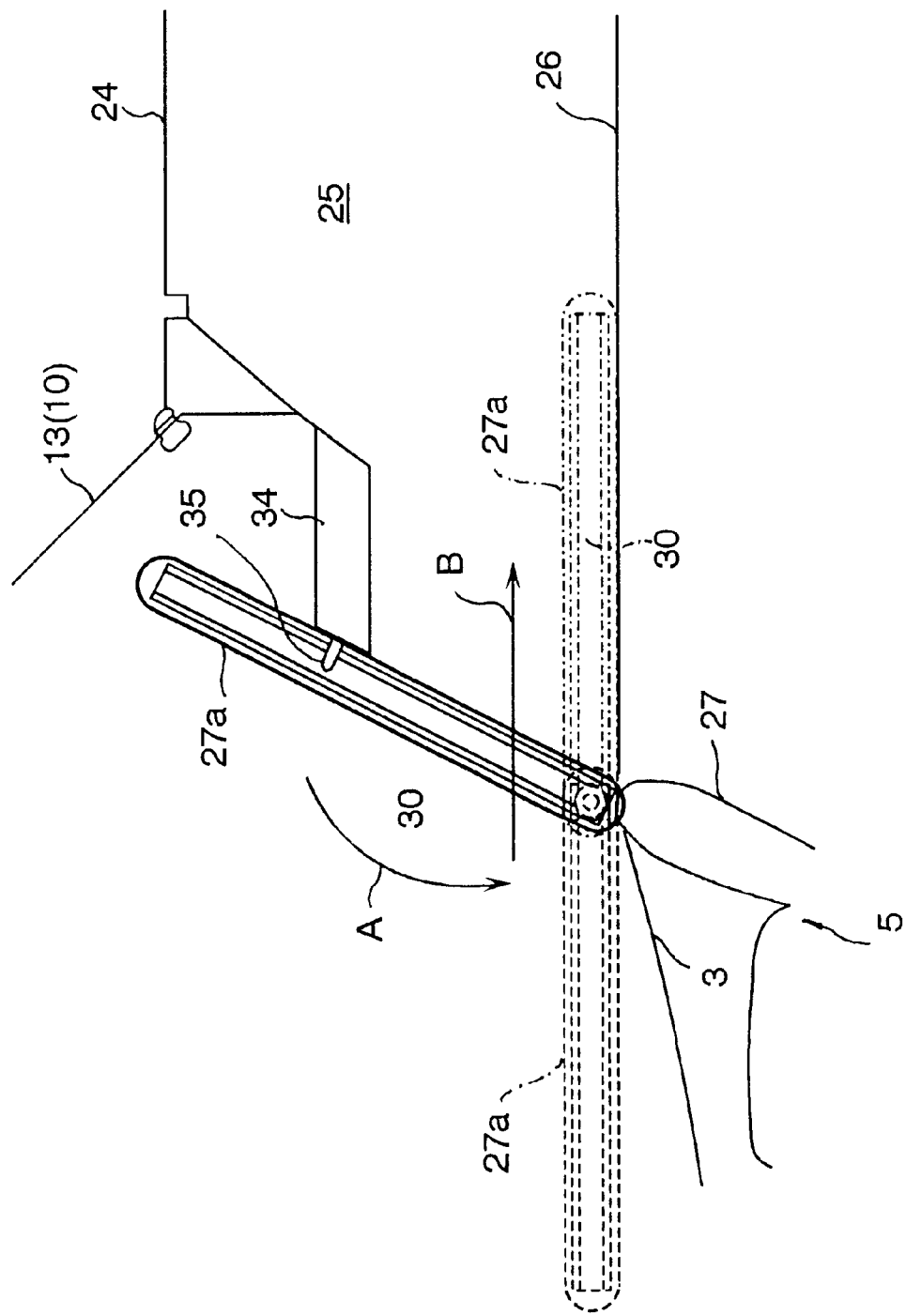
FIG. 7 is a side view of the upper seatback of the rear seatback.

Referring to FIGS. 5 through 7, the upper seatback 27a at its lower end of each of the rear seats 5 disposed on opposite sides of the floor tunnel 3 is pivotally mounted to the trunk room floor 26 by a pair of hinges 28 so as to lay forward down. The hinge 28 is provided with a roller 29 that rotates about a pivotal axis of the hinge 28 and is received in a guide slot of a guide rail 30 secured to a side surface of the upper seatback 27a so as to slide in the guide slot of the guide rail 30. There is provided a seatback latch mechanism for releasably holding the rear seatback 27 in an erect position where the tipper seatback 27a extends straight up from the stationary lower seatback 27b. The seatback latch mechanism comprises a latch lever 32 installed in the upper seatback 27a so as to slide up mid down, a retainer 33 secured to the back of the upper seatback 27a and a striker 35 secured to a rear suspension tower 34 for a rear wheel. While the upper seatback 27a is in the erected position, the retainer 33 is brought into engagement with the striker 35 and the latch lever 32 keeps engagement of the retainer 33 with the striker 35. When the latch lever 32 is pulled up, it releases the engagement of the retainer 33 with the striker 35 so as thereby to allow the upper seatback 27a to lay forward down into the horizontal position as shown by an arrow A in FIGS. 5 and 7. The upper seatback 27a in the horizontal laid position call be moved backward out of the rear space 20 of the passenger compartment 2 and into the trunk room 26 as shown by an arrow B in FIGS. 5 and 7. The upper seatback 27 can be returned to the erect position in a reverse way.

Figure 4:
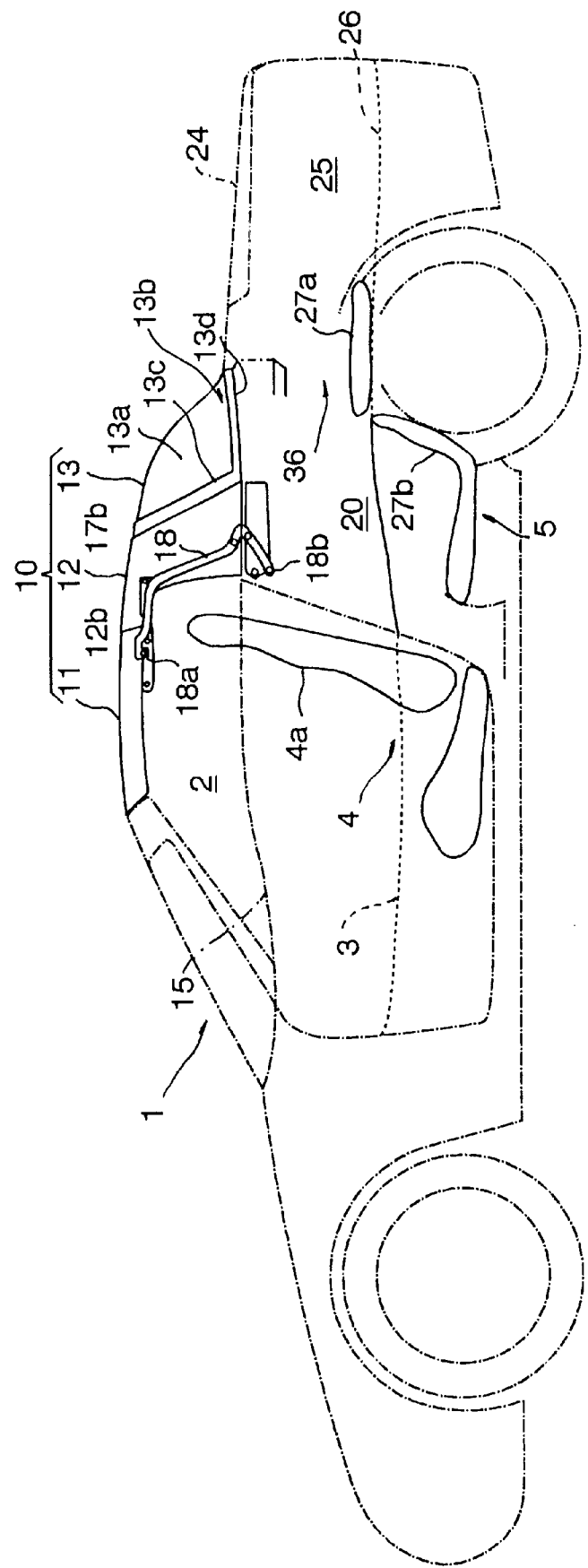
FIG. 4 is a side view of the vehicle with an upper seatback of a rear seatback of a rear seat is laid forward down and then slid backward in a trunk room so as thereby to make a passenger compartment open into the trunk room.

As apparent from FIG. 6 showing the left rear seat 5 with the upper seatback 27a moved into the trunk room 26, there is provided the trunk-through formation as shown in FIG. 4, the vehicle 1 can be loaded with even an article that is too long to be stored within the trunk room 26 over the rear space 20 and the trunk room 26. In addition, the vehicle 1 can be loaded with even a bulky article that is too big to be received within the trunk room 26 in the rear space 20.

Figure 8A:
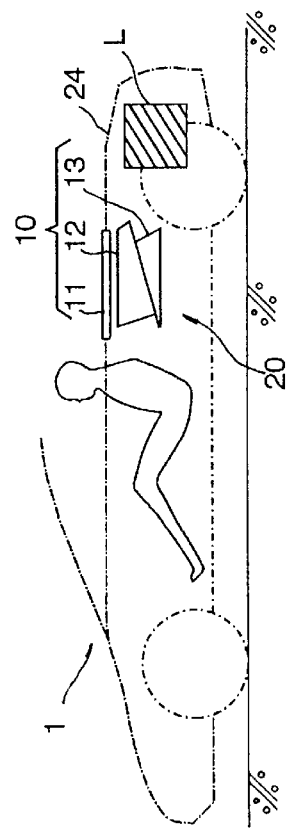
FIG. 8A is a schematic side view of the vehicle in the two-seater open mode.
Figure 8C:
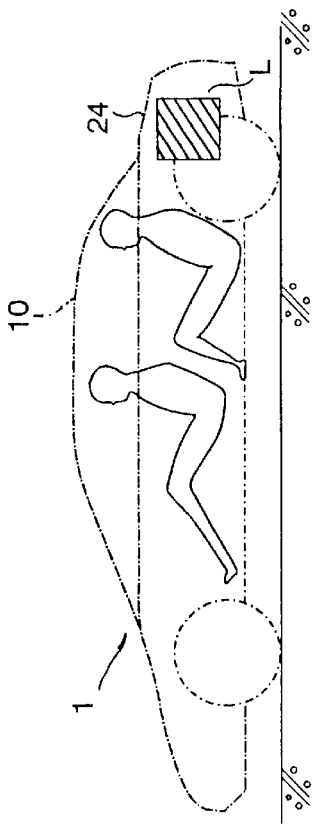
FIG. 8C is a schematic side view of the vehicle in an ordinary four-seat mode.
Figure 8B:
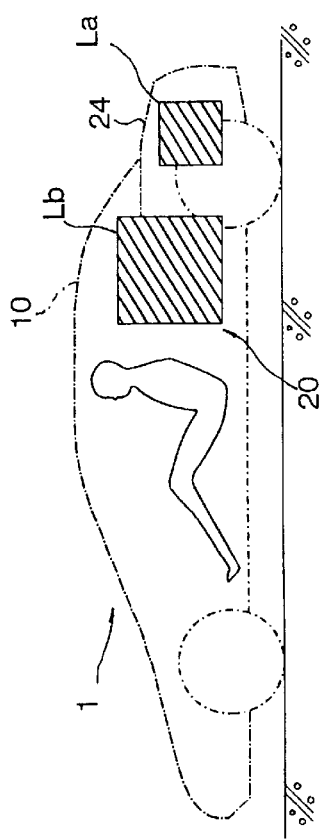
FIG. 8B is a schematic side view of the vehicle in a closed utility mode.

FIGS. 8A, 8B and 8C schematically show the vehicle 1 in different modes of usage. As apparent, the vehicle 1 with the folding hard roof 10 retracted in the roof storage space 20 can be used as an two-seater open vehicle (which is referred to as a two-seater open mode I) as shown in FIG. 8A. Otherwise, the vehicle 1 with the folding hard roof 10 in a raised operative position is used as a two-door coupe (which is referred to as a closed mode II or III). The vehicle in the closed mode can be changed between two different modes, namely an utility mode II in which the upper seatback 27a of at least one of the rear seats 5 is laid forward down and then moved backward into the trunk room 26 so as thereby to make the rear space 20 of the passenger compartment 2 open into the trunk room 26 as shown in FIG. 8B and an ordinary four-seat mode III in which the upper seatback 27a of the rear seats 5 is in the erect position as shown in FIG. 8C. In the two-seater open mode I in which the upper seatback 27a of the rear seats 5 are laid forward down and then moved into the trunk room 26, the vehicle 1 provides the roof storage space 20 in which the folding hard roof 10 is compactly retracted. In the utility mode II in which the upper seatback 27a of at least one of the rear seats 5 is laid forward down and then moved into the trunk room 26 so as thereby to make the rear space 20 open into the trunk room 26, the vehicle 1 expands a utilizable space for cargos L space. In consequence, the vehicle 1 can be loaded with even an article La that is too long to be stored within the trunk room 26 over the rear space 20 and the trunk room 26. In addition, the vehicle 1 can be loaded with even an article Lb that is too bulky to be received within the trunk room 26 in the rear space 20 in addition to articles in the trunk room 26.

According to the foregoing description, since the upper seatbacks 27a of the rear seats 5 are laid forward down and moved into the trunk room 26 before retracting the folding hard roof 10 into the roof storage space 20, the rear roof compartment 13 of the folding hard roof 10 is prevented from mechanically interfering with the upper seatbacks 27a of the rear seats 5 when the folding hard roof 10 is retracted. In particular, the roof storage space 20 has a width elongated in the lengthwise direction that is provided above the floor tunnel 3 by laying down the upper seatbacks 27a, so as to receive the middle roof component 12 that is comparatively bulky as compared with the remaining roof components.

Figure 9:
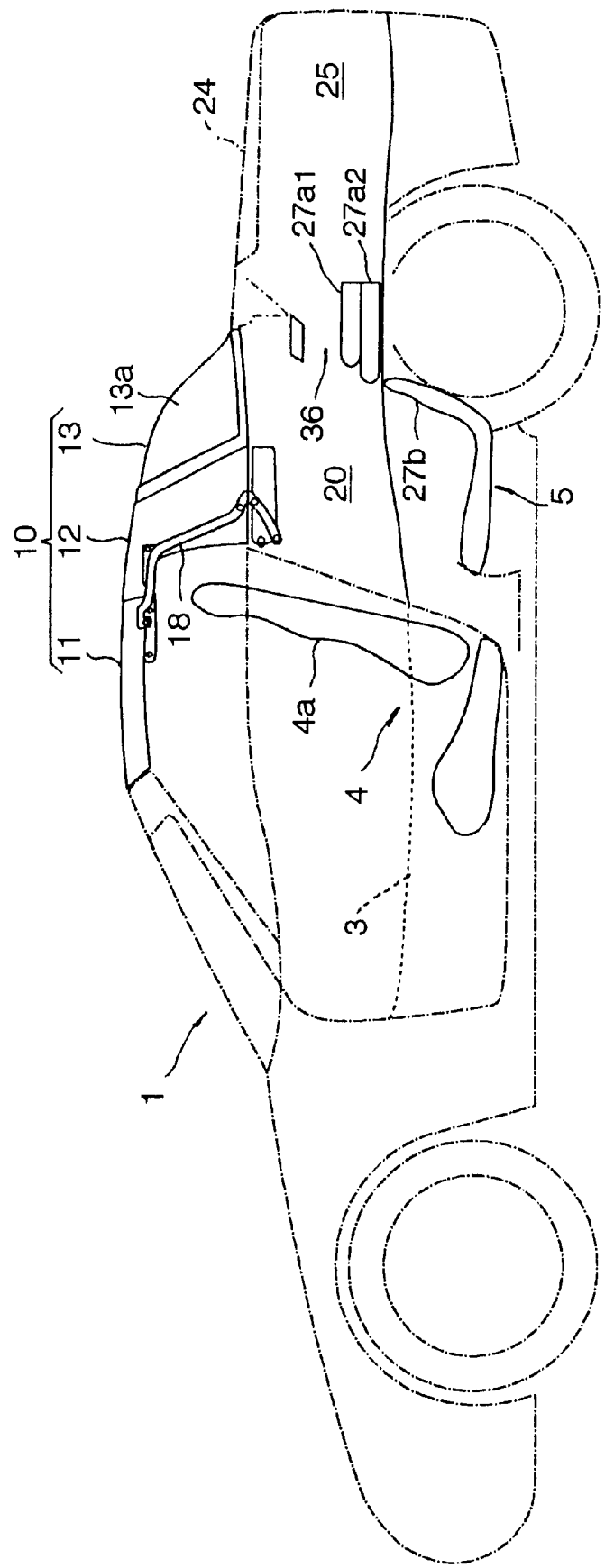
FIG. 9 is a side view of a vehicle with a roof storage structure in accordance with another embodiment of the present invention in which an upper seatback of a folding rear seatback of a rear seat is folded and laid down so as thereby to make a passenger compartment open into a trunk room.
Figure 10:
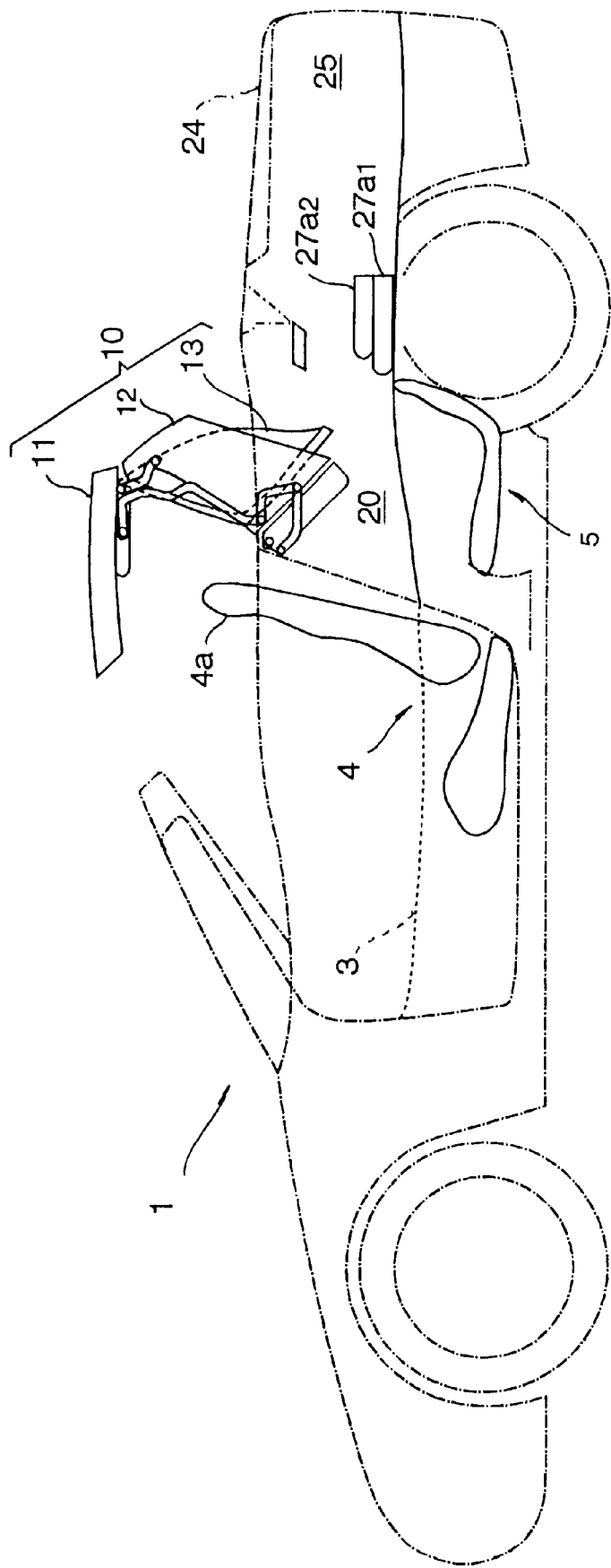
FIG. 10 is a side view of the vehicle of the other embodiment in which the folding hard roof is on the way to a roof storage space.
Figure 11:
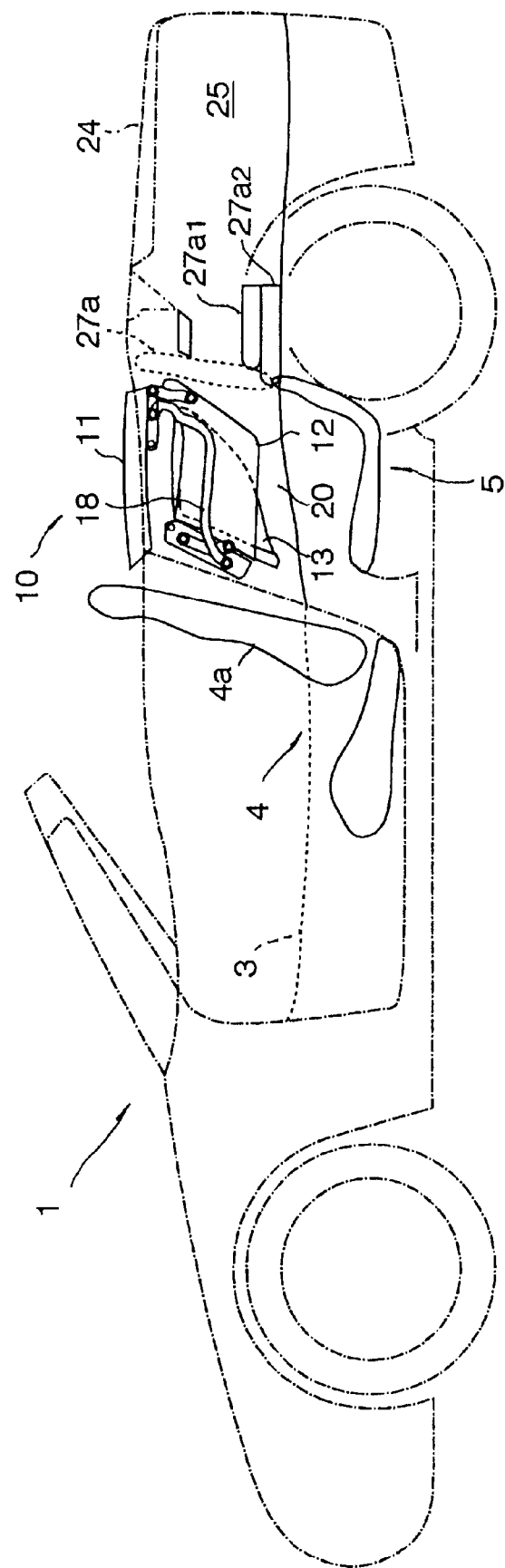
FIG. 11 is a side view of the vehicle of the other embodiment in a two-seater open mode in which the folding hard roof is retracted.

FIGS. 9 through 12 show a vehicle 1 with a folding hard roof 10 that is suitably retracted in a roof storage structure in accordance with another embodiment of the present invention. The vehicle 1 shown in FIGS. 9 through 11 is just the same in structure and operation as that of the previous embodiment shown in FIGS. 2 through 4, except that a twofold upper seatback 27a is employed.

The twofold upper seatback 27a of a rear seatback 27 of a rear seat 5 extends above a floor tunnel 3 and is made up of two mating upper seatback sections, namely an upper seatback section 27a1 and a lower seatback section 27a2. The upper seatback section 27a1 is pivotally mounted to the top of the lower seatback section 27a2 so as to turn approximately 180° forward down against the lower seatback section 27a1. On the other hand, the lower seatback section 27a1 is pivotally mounted on the trunk room floor 26 of a trunk room 25 so as to turn approximately 90° situate backward and to be situated in a horizontal position in the trunk room 25.

Figure 12A:
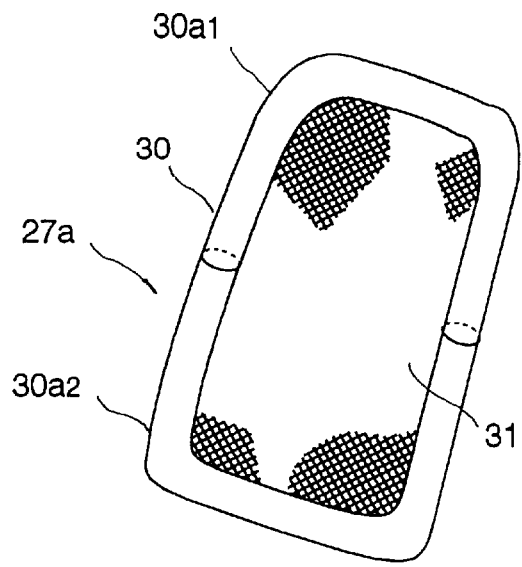
FIG. 12A is a perspective view of the folding rear seatback.

FIG. 12A shows the twofold upper seatback 27a in detail. As shown, the twofold upper seatback 27a comprises a generally rectangular twofold frame 30 and a flexible back sheet 31 such as a net sheet or a fabric which is stretched on the twofold frame 30. The twofold frame 30 comprises a pipe frame 30 made up of two mating frame halves, namely an upper frame half 30a1 for the tipper seatback section 27a1 and a lower frame half 30a2 for the lower seatback section 27a2. The twofold upper seatback 27a may be of a folding type or a telescopic type.

Figure 12B:
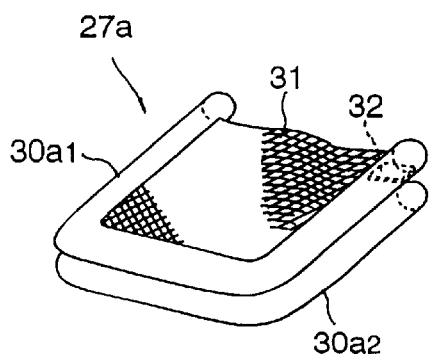
FIG. 12B is a perspective view showing one example of the folding rear seatback.

Specifically as shown in FIG. 12B, a folding type of the twofold upper seat back 27a comprises a generally rectangular twofold frame 30 that is made up of a generally U-shaped upper frame half 30a1 on which a flexible back sheet 31 is stretched and a generally U-shaped lower frame half 30a2 on which a flexible back sheet 31 is stretched. These upper and lower frame halves 30a1 and 30a2 are connected by hinges 32 so that the upper frame half 30a1 turns 180° forward down against the lower frame half 30a2.

Figure 12C:
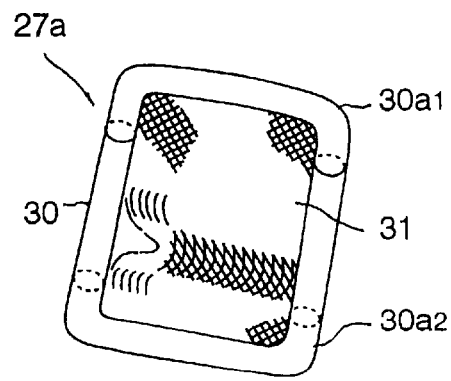
FIG. 12C is a perspective view showing another example of the folding rear seatback.

As shown in FIG. 12C, a telescopic type of the twofold upper seatback 27a comprises a generally rectangular twofold pipe frame 30 on which a elastic back sheet 31 is stretched between upper and lower crossbars. The twofold frame 30 is made up of an upper frame half 30a1 comprising a generally U-shaped pipe and a lower frame half 30a2 comprising a generally U-shaped pipe that are telescopically coupled together. When retracting the upper frame half 30a1 into the lower frame half 30a2, the twofold upper seatback 27a is shortened approximately half in vertical length. In the shortened position of the twofold upper seatback 27a, the elastic back sheet 31 may be somewhat loosen.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A roof storage structure for a four-seat vehicle with a folding hard roof that closes and opening a passenger compartment, comprising:

a front seat;

a rear seat having a rear seatback at least partly movable backward; and a roof storage space formed in said passenger compartment for receiving said folding hard roof retracted therein;

wherein said roof storage space is provided by a rear passenger space between said front seat and said rear seat that is expanded in a lengthwise direction of said passenger compartment from the front to the back by moving said rear seatback backward.

2. A roof storage structure as defined in claim 1, wherein said folding hard roof comprises front, middle and rear roof parts mechanically connected with one another and is retracted with said middle and rear roof parts superposed on each another below said front roof part situated horizontally in said roof storage space.

3. A roof storage structure as defined in claim 1, wherein said rear roof part doubles as a rear windshield.

4. A roof storage structure as defined in claim 1, wherein said rear seat comprises a seat cushion and a rear setback extending upward from said seat cushion, said seatback being at least partly movable backward with respect to said rear passenger space.

5. A roof storage structure as defined in claim 1, wherein said rear seat comprises a seat cushion and a rear setback extending upward from said seat cushion and comprising a stationary lower seatback part and an upper seatback part capable of turning forward down into a horizontal position and then moving backward with respect to said lower seatback part so as to expand said rear passenger space in said lengthwise direction of said passenger compartment.

6. A roof storage structure as defined in claim 5, wherein said upper seatback part comprises a lower seatback half pivotally connected to said stationary lower seatback part and an upper seatback half movably connected to said lower seatback half so that said lower seatback half is turned backward down into a horizontal position after superposing said upper seatback half on said lower seatback half, thereby expanding said rear passenger space in said lengthwise direction of said passenger compartment.

7. A roof storage structure as defined in claim 5, wherein said upper seatback part is of a telescopic type comprising a lower seatback half pivotally connected to said stationary lower seatback part and an upper seatback half retractably connected to said lower seatback half so that said lower seatback half is turned backward down into a horizontal position after retracting said upper seatback half into said lower seatback half, thereby expanding said rear passenger space in said lengthwise direction of said passenger compartment.

8. A roof storage structure as defined in claim 5, and further comprising seatback latch means for releasably holding said upper seatback part in a position where said upper seatback part extends straight up from said stationary lower seatback part.

9. A roof storage structure as defined in claim 1, wherein said vehicle is provided with a trunk room behind said passenger compartment and said rear seat is at least partly movable backward into said trunk room.

10. A roof storage structure as defined in claim 9, wherein said trunk room is spatially separated from said passenger compartment by said rear seat and is made open into said passenger compartment when said rear seat at least partly moved le into said trunk room.

11. A roof storage structure as defined in claim 1, wherein said rear seat comprises a seat cushion and a seatback partly integral with said seat cushion and partly movable with respect to said seat cushion.

* * * * *